(12) United States Patent
Comstock

(10) Patent No.: US 6,963,895 B1
(45) Date of Patent: Nov. 8, 2005

(54) FLOATING POINT PIPELINE METHOD AND CIRCUIT FOR FAST INVERSE SQUARE ROOT CALCULATIONS

(75) Inventor: Mark H. Comstock, Menlo Park, CA (US)

(73) Assignee: Raza Microelectronics, Inc., San Jose, CA (US)

( * ) Notice: Subject to any disclaimer, the term of this patent is extended or adjusted under 35 U.S.C. 154(b) by 0 days.

(21) Appl. No.: 09/562,056

(22) Filed: May 1, 2000

(51) Int. Cl.[7] ................................. G06F 7/38
(52) U.S. Cl. ................................. 708/502; 708/495
(58) Field of Search ................ 708/446, 490, 708/620–656, 502, 605, 290, 495, 510, 500

(56) References Cited

U.S. PATENT DOCUMENTS

| | | | | |
|---|---|---|---|---|
| 5,060,182 A | * | 10/1991 | Briggs et al. | 708/605 |
| 5,159,566 A | * | 10/1992 | Briggs et al. | 708/605 |
| 5,768,170 A | * | 6/1998 | Smith | 708/504 |
| 5,847,979 A | * | 12/1998 | Wong et al. | 708/500 |
| 6,115,733 A | * | 9/2000 | Oberman et al. | 708/654 |
| 6,134,574 A | * | 10/2000 | Oberman et al. | 708/551 |
| 6,341,300 B1 | * | 1/2002 | Shankar et al. | 708/605 |
| 6,349,319 B1 | * | 2/2002 | Shankar et al. | 708/500 |
| 6,549,924 B1 | * | 4/2003 | Miller, Jr. | 708/270 |

* cited by examiner

*Primary Examiner*—Kakali Chaki
*Assistant Examiner*—Chat C. Do
(74) *Attorney, Agent, or Firm*—IP Strategy Group, PC

(57) ABSTRACT

Methods and systems are provided for fast computation of reciprocal square root for floating-point numbers. A piecewise linear approximation of the result mantissa is computed in two cycles and used as the input to an iteration sequence that converges cubically. Three iterations produce a result with accuracy sufficient for computer graphic applications. The initial estimate and input operand are scaled to minimize final adjustments to the result mantissa and final exponent adjustments required by the algorithm are performed concurrently with any adjustment required by rounding. A pipelined implementation of the algorithm produces a result with a latency of 24 and a repeat rate of 21 clock cycles.

7 Claims, 4 Drawing Sheets

FLOATING POINT PIPELINE METHOD AND CIRCUIT FOR FAST INVERSE SQUARE ROOT CALCULATIONS

BACKGROUND INFORMATION

1. Field of the Invention

The invention relates to integrated circuits, and particularly to computations for computer graphics.

2. Description of Related Art

Graphic software applications use floating-point instructions for computation of images in a computing system. An image is typically calculated using approximation to reduce processing time since the computation of floating-point instructions in graphics do not require the same level of precision as in scientific applications. For any floating-point computation, there are basically two separate, but related computations that need to be performed. The first portion is the computation of the result exponent. The second portion is the computation of the result mantissa.

A conventional approach performs a calculation of a reciprocal square root in two instructions. The first instruction computes the square root, and the second instruction computes a reciprocal of that square root. In one example, a system requires one clock cycle for each bit of mantissa, using about 48 clock cycles to complete the computation.

Accordingly, it is desirable to have methods and systems for computing floating-point instructions in reduced time while maintaining sufficient accuracy.

SUMMARY OF THE INVENTION

The invention provides methods and systems for fast computation of reciprocal square root for floating-point numbers. A piece-wise linear approximation of the result mantissa is computed in two cycles and used as the input to an iteration sequence that converges cubically. In one embodiment, three iterations produce a result with accuracy sufficient for computer graphic applications. The initial estimate and input operand are scaled to minimize final adjustments to the result mantissa and final exponent adjustments required by the algorithm are performed concurrently with any adjustment required by rounding. A pipelined implementation of the algorithm produces a result with a latency of 24 and a repeat rate of 21 clock cycles.

DETAILED DESCRIPTION OF PREFERRED EMBODIMENT

A generic floating point number comprises a mantissa in the range (2,1] and an exponent that scales the mantissa to a specific power of 2. Computing the inverse square root of a floating-point number involves separate algorithms for the exponent and mantissa portions of the number.

$$S = mant \times 2^{ES}$$

$$S^{-1/2} = mant^{-1/2} \times 2^{-ES/2}$$

Figure 1:
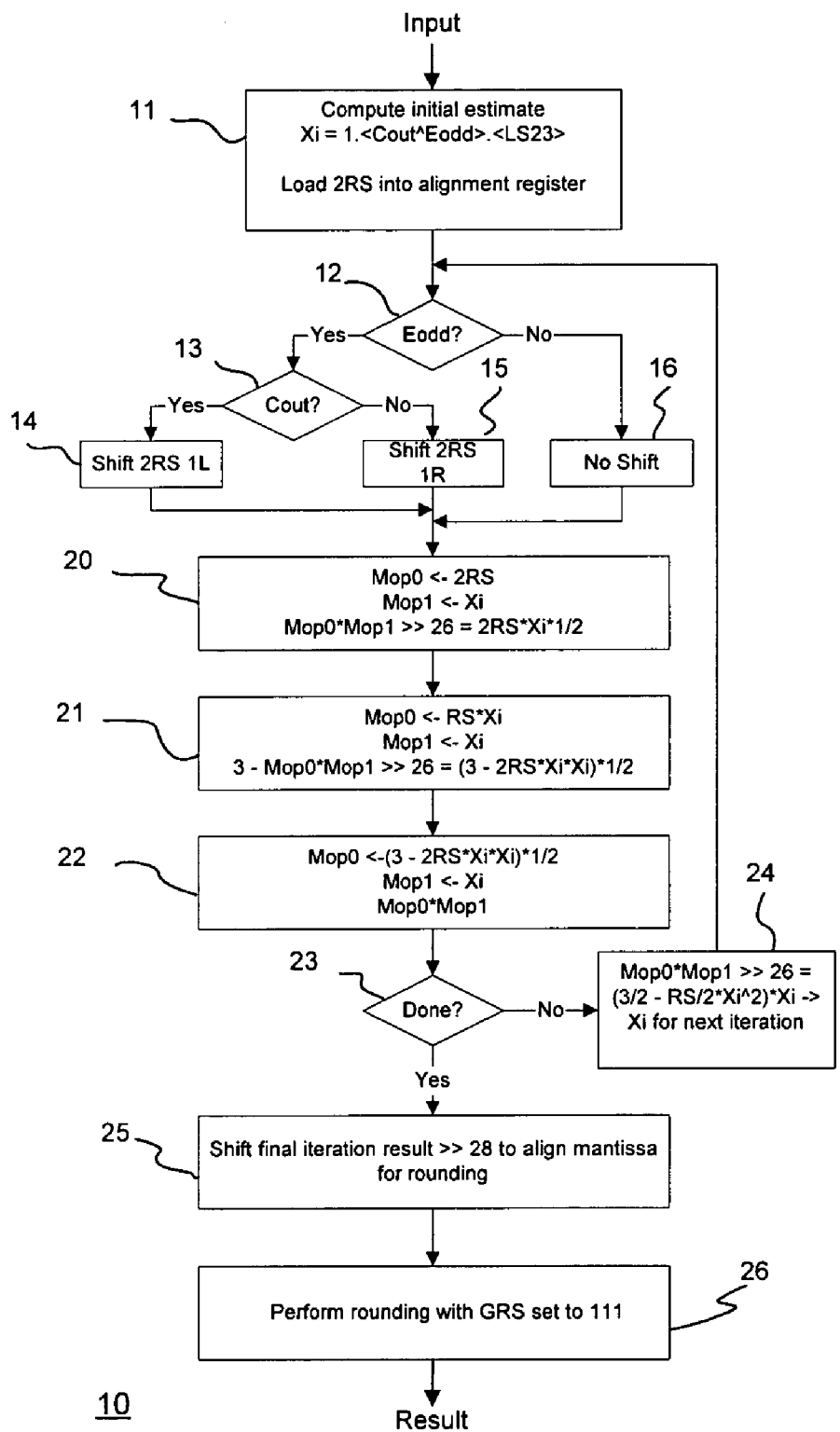
FIG. 1 is a flow diagram illustrating the computation of an inverse reciprocal square root of a mantissa algorithm in accordance with the present invention.
Figure 2:
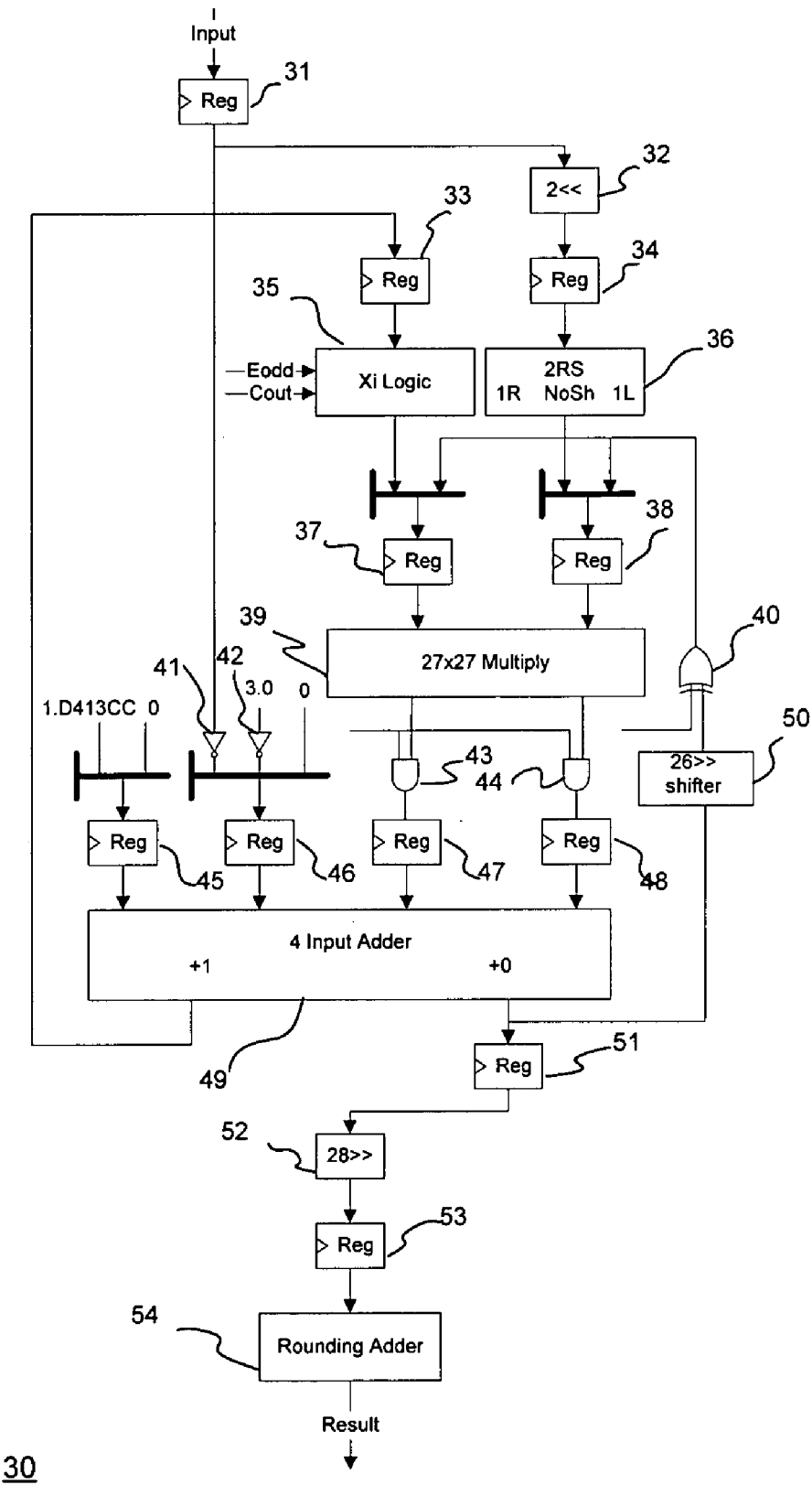
FIG. 2 is a logic diagram illustrating a mantissa data path for computing inverse square root in accordance with the present invention.

FIGS. 1 and 2 show a flow diagram and logic diagram, respectively, of the mantissa algorithm 10 in computing the reciprocal square root of the mantissa portion of a floating-point number. The mantissa algorithm 10 is an iterative process in which a value is substituted in an expression to produce a result. That result is substituted back into the expression to obtain a better result. The process repeats until the expression generates a result that yields sufficient accuracy. In one embodiment, the mantissa algorithm 10 performs the computation three times to reach sufficient accuracy for the mantissa portion of a single-precision floating point number used in a computer graphics application.

The mantissa algorithm 10 in principle is divided into two parts, in which the first part computes an initial estimate in step 11, and the second part performs the iterative process in steps 12–24 starting with the initial estimate. The initial estimate needs to be sufficiently close to the final value to obtain a satisfactory result within three iterative processes.

The mantissa portion of an inverse square root calculation can be determined iteratively using the following expression.

$$X_{i+1} = (3/2 - R/2 \times X_i^2) \times X_i$$

If the initial estimate, $X_i$, is sufficiently close to $1/\sqrt{R}$, the accuracy of the result can be refined to any desired degree. The challenge then becomes selecting an initial estimate that converges to a result with the desired accuracy within a specified number of iterative steps.

When the number representation used in the iteration expression is floating-point, a restriction applies. Floating-point subtraction can be performed only between numbers with equal exponents. Since the constant term, 3/2, has an effective exponent of 0, R and $X_i$ must be selected so that the product, $R \times X_i^2$, also has an exponent with value 0. The exponent and mantissa of the R and $X_i$ terms must be scaled to meet this criterion. In addition, the mantissa algorithm 10 begins and ends with a mantissa in normal alignment. In implementation, the iteration method is used to compute the inverse square root of the mantissa. The R and $X_i$ mantissa values are scaled by alignment during the iteration sequence to meet the criteria given above and the correct exponent is computed separately.

$X_i$ is derived from a piece-wise linear approximation to the curve $1/\sqrt{R}$. In the following description, R is the mantissa of the floating-point number for which the inverse square root is computed and $R_S$ represents the scaled version of R required by the algorithm. Mantissa algorithm 10 performs 11 to compute $X_i$.

1. Store the mantissa, R, in an input register 31.

2. Complement R with an inverter 41 and transfer the value to an adder input register 46. The constant term 1.D413CC is stored in a register 45. The multiply array inputs are masked to 0 and stored in registers 47 and 48. Subtract R from 1.D413CC using a 4-input adder 49 and save the result in a register 53. Call the least significant 23-bits of the result LS23.

3. Save the carry out ($C_{out}$) from the subtraction. Determine if the input exponent is odd ($E_{odd}$) and save this information in a register 35.

4. Produce $X_i = 1.<C_{out} \oplus E_{odd} <> LS23>$ in the register 35 and store the result in a register 37.

When $X_i$ is assembled in this manner, the corresponding values of $R_S$ are as listed in Table 1 below.

TABLE 1

| $E_{odd}$ | $C_{out}$ | R | $R_S$ | $X_i$ |
|---|---|---|---|---|
| 1 | 0 | $(2\sqrt{2} - 1, 2.0)$ | $(2\sqrt{2} - 1)/8, 0.25$ | $2.0, \sqrt{2} + 0.5$ |
| 0 | 1 or 0 | $[1.0, 2.0)$ | $0.25, 0.5$ | $\sqrt{2} + 0.5, \sqrt{2}$ |
| 1 | 1 | $[1.0, 2\sqrt{2} - 1]$ | $0.5, (2\sqrt{2} - 1)/2$ | $\sqrt{2}, 1.0$ |

For each row, the $(R_S, X_i)$ pairs define a three slope, piece-wise linear approximation to $1/\sqrt{R_S}$. The $R_S$ values are derived directly from R by right shifts of 3, 2 and 1 respectively.

The values listed for $X_i$ are exactly those of a normal mantissa. For two of the three cases, the final result after three iteration sequences lies in this range. For the case that $E_R$ is odd in an operation and the piece-wise linear approximation produces a $C_{out}$, some final results are slightly greater than 2.0. These values are easily handled by the rounding logic, which deals with the case that the mantissa is 1-bit super normal as part of its general capabilities. Scaling the inputs so that Xi lies in this range keeps the design of the rounding logic generic.

The iterative steps of the algorithm are as follows. Mantissa algorithm 10 determines in step 12 if the exponent odd. If the exponent is not odd, no shift of $2R_S$ is required in step 16. If the exponent is odd, the mantissa algorithm 10 determines 13 if the subtraction in step 11 produce a $C_{out}$. If a $C_{out}$ was produced, mantissa algorithm 10 shifts $2R_S$ 1bit left in step 14; if not, shift $2R_S$ 1-bit right in step 15. The iteration expression is implemented in three steps 20, 21, and 22. Mop0 and Mop1 are multiply operands. The combined execution of steps 20–22 implements the iteration expression in Equation 1:

$$X_{i+1}=(3/2-R/2 \times X_i^2) \times X_i \qquad \text{Eq}(1)$$

Step 23 is a query as to whether or not sufficient iterations have been performed. If not, the result of step 22 becomes Xi for the next iteration sequence and steps 12–22 are repeated. If sufficient iterations have been performed, the result is normalized in step 25 and rounded in step 26.

The result exponent for an inverse square root calculation is determined as follows.

$$E_{res}=-E_R/2$$

Where $E_R$ is the unbiased value of the input exponent, in one implementation, the effective value of $E_R$ is increased due to the scaling of R to $R_S$ by right shifts. This value is represented by $E_{RS}$. In Table 2 below, the values of $E_R$, $E_{RS}$ and $E_{res}$ are given in terms of the generic forms for odd and even numbers: 2A and 2A+1.

TABLE 2

| $E_{odd}$ | $C_{out}$ | $E_R$ | Scale Shift | $E_{RS}$ | $E_{res}$ |
|---|---|---|---|---|---|
| 1 | 0 | 2A + 1 | 3 | 2A + 4 | −A − 2 |
| 0 | 1 or 0 | 2A | 2 | 2A + 2 | −A − 1 |
| 1 | 1 | 2A + 1 | 1 | 2A + 2 | −A − 1 |

The final result and the initial estimate of the exponent have the same value, less a possible correction due to rounding. For each case, $E_{RS}+2E_{res}=0$ is required for the subtraction in the iteration expression.

The multiply inputs are 27-bits wide. The multiply operands are aligned as shown in Table 3.

TABLE 3

| $X_1$ | 01.xxxxxxxxxxxxxxxxxxxxxxx00 |
|---|---|
| $2R_S$ 1L | 1.xxxxxxxxxxxxxxxxxxxxxxx000 |
| $2R_S$ No Shift | 0.1xxxxxxxxxxxxxxxxxxxxxxx00 |
| $2R_S$ 1R | 0.01xxxxxxxxxxxxxxxxxxxxxxx0 |

As illustrated in FIG. 2, R is aligned for multiplication 32 and stored in register 34. The scaling of R to $R_S$ is performed with shifter 36. The iteration sequence $X_{i+1}=(3/2-R/2 \times X_i^2) \times X_1$ is implemented and divided into three steps. When $1/\sqrt{R}$ is substituted for $X_i$, $X_{i+1}$ is exactly equal to $1/\sqrt{R}$.

1. $(2R_S \times X_i)/2$: $X_i$ is loaded into the left multiply array input register 37 and remains there throughout the 3 iteration steps. $2R_S$ is loaded into the right multiply array register 38. The multiply array 39 produces a product in compound form in AND gate 43 and AND gate 44. The two outputs from AND gates 43 and 44 are combined in adder 49 to obtain the value required for the next iteration step. FIG. 2 shows the multiply array outputs registered 47 and 48 and input to adder 49. The output from the adder 49 equals to $2R_S \times X_i$, which is stored in the right multiply array register 38 with a 26-bit right shift 50. This last action is equivalent to dividing the product by 2.

2. $(3-(R_S \times X_i) \times X_i)/2$: The second step is a fused multiply subtract. The result computed in the first step is multiplied by $X_i$. The compound multiply array result is registered and subtracted from the constant value 3.0 feed into inverter 42 in adder 49. The result is complemented with exclusive OR gate 40, shifted 26-bits right 50 and stored in the right multiply array input register 38.

3. $((3-(R_S \times X_i) \times X_i)/2) \times X_i$: The second result is multiplied by $X_i$. This value is now equal to $X_{i+1}$ as defined by the iteration expression.

To perform another iteration sequence, $X_{i+1}$ is loaded into the left multiply array input register 37 and the right multiply array input register 38 is restored to $2R_S$. If this sequence is performed three times, the final result will be within ±2 ulps with respect to the result obtained by performing sequential SQRT→RECIP operations, where both the intermediate and final results are rounded in accordance with ANSI/IEEE Std 754-1985, the IEEE Standard for Binary Floating-Point Arithmetic. After the third sequence, the final result is registered 51, shifted 28-bits left in shifter 52 and staged down a pipe 53 to a rounding adder 54.

Figure 3:
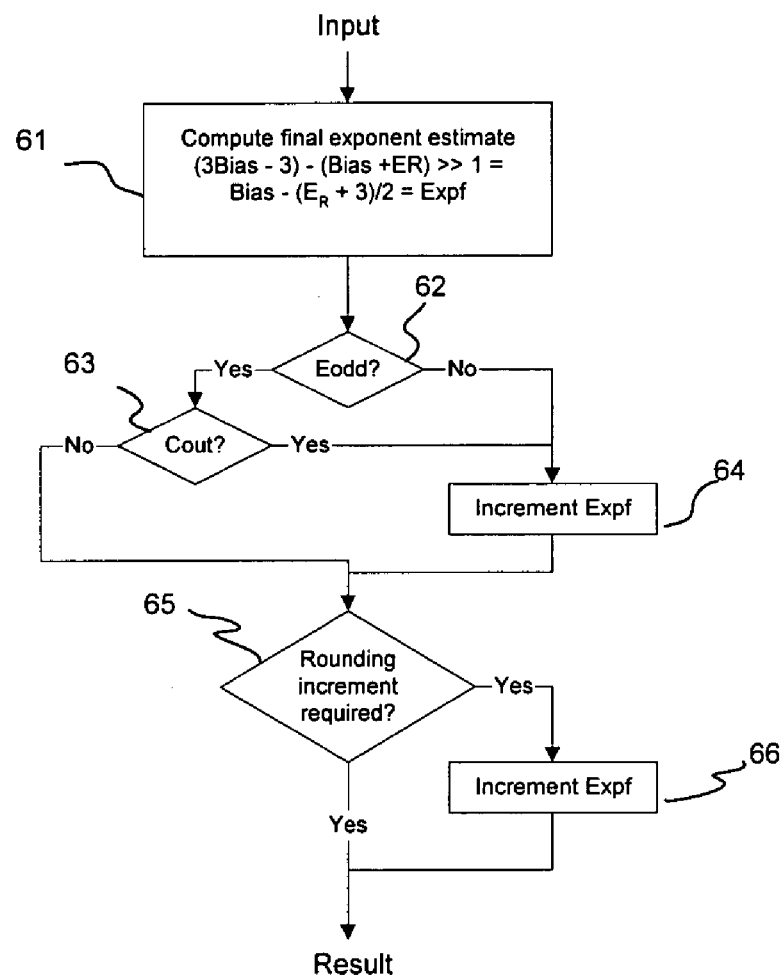
FIG. 3 is a flow diagram illustrating an exponent algorithm for computing an inverse square reciprocal square root in accordance with the present invention.
Figure 4:
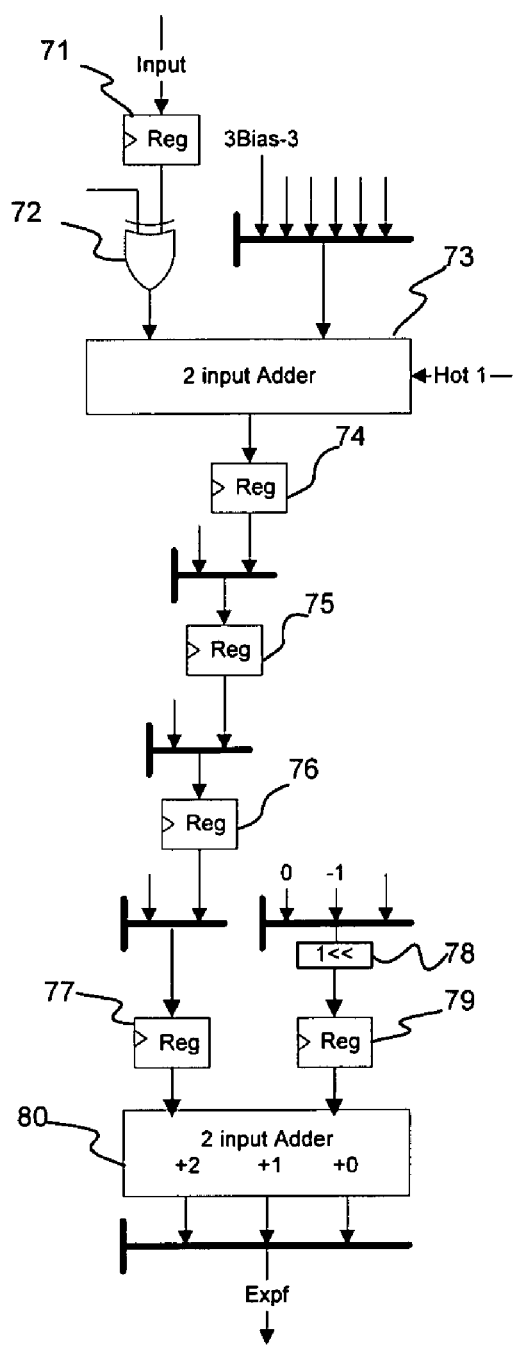
FIG. 4 is a logic diagram illustrating an exponent data path for computing inverse square root in accordance with the present invention.

FIGS. 3 and 4 show a flow diagram and logic diagram, respectively, of an exponent algorithm 60 for computing a reciprocal square root in accordance with the present invention. For exponent data path for inverse square root, all exponent operations are performed without removing the bias. The initial estimate is obtained 61 from the following steps.

1. $(3\text{Bias}-3)-(\text{Bias}+E_R)=2\text{Bias}-E_R-3$ (step 61)
2. $(2\text{Bias}-E_R-3)>>1=\text{Bias}-A-2$ (for both odd and even $E_R$) (step 61)
3. During rounding, add 1 if $\sim E_{odd}$ or $E_{odd} \cdot C_{out}$ (steps 62, 63, 64) in addition to the possible rounding adjustment (step 66).

As shown in FIG. 4, the exponent makes use of two main resources: (1) 2-input 1-output adder to compute the subtraction, and (2) 2-input and 3-output adder 72 to make rounding and algorithm adjustments. In general, rounding may require a decrement or an increment to the final exponent. The default selection for the constant MUX to the final adder is −1. This effectively changes the three adder outputs to exponent data +1, 0 and −1 from which the correct result can be selected. If the inverse square root algorithm requires an additional increment, the constant MUX selects +0 so that rounding and algorithm requirements are superimposed.

The exponent portion of the input floating point number is registered in 71. The register output is complemented by XOR gate 72 and the constant, 3Bias−3, is selected as the second input to adder 73. The adder output, (3Bias−3)−(Bias+$E_R$)=2Bias−$E_R$−3, is registered in 74. This value is shifted 1-bit right and stored in register 75. After the shift, the exponent value is Bias−A−2 where A is part of the representation of $E_R$ as a generic odd or even number as described above. This value is staged down the pipe through register 76 to register 77 where the value is input to final exponent adder 79. The value selected for the second adder input 79 is either 0 or −1 via shifter 78 depending on the resolution of steps 62–66 in exponent algorithm 60.

In the exponent data path for inverse square root, the un-labeled entry points indicate places where data required by different algorithms can enter when these resources are used in a complete FPU data path. In one example, a processor computes a single-precision floating point reciprocal square root instruction with a latency of 24 clock cycles and a repeat rate at 21 clock cycles.

The above embodiments are only illustrative of the principles of this invention and are not intended to limit the invention to the particular embodiments described. Accordingly, various modifications, adaptations, and combinations of various features of the described embodiments can be practiced without departing from the scope of the invention as set forth in the appended claims.

What is claimed is:

1. A computer implemented method for use in a floating point pipeline for estimating a reciprocal square root of a mantissa component in a floating point number, comprising the steps of:
    providing a constant number, K, between [1,2); and
    computing an initial estimate, $X_i$, of the inverse square root of a mantissa component, R, in two clock cycles wherein the initial estimate is computed using the constant number K, and iteratively using the expression: $X_{i-1}=(3/2-R/2\times X_i2)\times X_i$;
    wherein K is the hexadecimal value of 1.D413CC; and
    wherein the initial estimate, $X_i$, is computed using <LS23>,<LS23> representing the least significant 23 bits of 1.D413CC-R.

2. The method of claim 1, wherein the initial estimate, $X_i$, is selected as a piecewise linear approximation to a curve $1/\sqrt{R}$.

3. The method of claim 2, further comprising the step of iteratively refining a piecewise linear approximation to produce a result within two least significant bits (LSB) of the result obtained.

4. The method of claim 3, wherein the result is obtained by the steps of:
    calculating and rounding a square root; and
    calculating and rounding the reciprocal of the square root.

5. The method of claim 1, wherein the mantissa component, R, is scaled to produce a scaled mantissa component, Rs, and wherein the initial estimate, $X_i$, is also scaled, to produce a product of $R\times X_i2$ with an exponent value of 0.

6. The method of claim 5, wherein the scaled mantissa component, $R_S$, comprises the step of shifting the mantissa component, R, by an n-number of times.

7. A computer implemented method for use in a floating point pipeline for estimating a reciprocal square root of a mantissa component in a floating point number, comprising the steps of:
    providing a constant number, K, between [1,2); and
    computing an initial estimate, $X_i$, of the inverse square root of a mantissa component, R, in two clock cycles wherein the initial estimate is computed using the constant number K;
    wherein the constant number K comprises a hexadecimal value of 1.D413CC; and
    wherein the initial estimate, $X_i$ is computed using <LS23>, <LS23> representing the least significant 23 bits of 1.D413CC-R.

* * * * *